(12) United States Patent
Dalal

(10) Patent No.: US 7,813,283 B1
(45) Date of Patent: Oct. 12, 2010

(54) CIRCUIT AND METHOD FOR ARBITRATION

(76) Inventor: Parin Bhadrik Dalal, 681 Berkshire Pl., Milpitas, CA (US) 95035-7524

( * ) Notice: Subject to any disclaimer, the term of this patent is extended or adjusted under 35 U.S.C. 154(b) by 432 days.

(21) Appl. No.: 11/890,132

(22) Filed: Aug. 4, 2007

Related U.S. Application Data

(60) Provisional application No. 60/835,504, filed on Aug. 4, 2006.

(51) Int. Cl.
*H04L 12/26* (2006.01)

(52) U.S. Cl. .................... 370/235; 370/412; 370/351

(58) Field of Classification Search ......... 370/229–235, 370/412, 351, 360, 400
See application file for complete search history.

(56) References Cited

U.S. PATENT DOCUMENTS

| | | | |
|---|---|---|---|
| 2005/0175014 A1* | 8/2005 | Patrick | 370/395.43 |
| 2007/0104210 A1* | 5/2007 | Wu et al. | 370/412 |
| 2007/0226332 A1* | 9/2007 | Becker-Szendy et al. | 709/224 |
| 2007/0253439 A1* | 11/2007 | Iny | 370/413 |
| 2007/0297417 A1* | 12/2007 | Cohen et al. | 370/395.42 |
| 2008/0207245 A1* | 8/2008 | Wakabayashi et al. | 455/522 |

* cited by examiner

*Primary Examiner*—Ricky Ngo
*Assistant Examiner*—Gary Mui

(57) ABSTRACT

This invention provides a data structure and circuit method for making arbitration decisions between a large number of consumers or parties contending for a resource. The circuit uses a novel data-structure for storing previous decisions of the circuit, so that the delays in circuit decisions are far shorter than logarithmic order, the conventional delay, in the number of consumers.

2 Claims, 4 Drawing Sheets

CIRCUIT AND METHOD FOR ARBITRATION

CROSS-REFERENCE TO RELATED APPLICATIONS

Figure 1A:
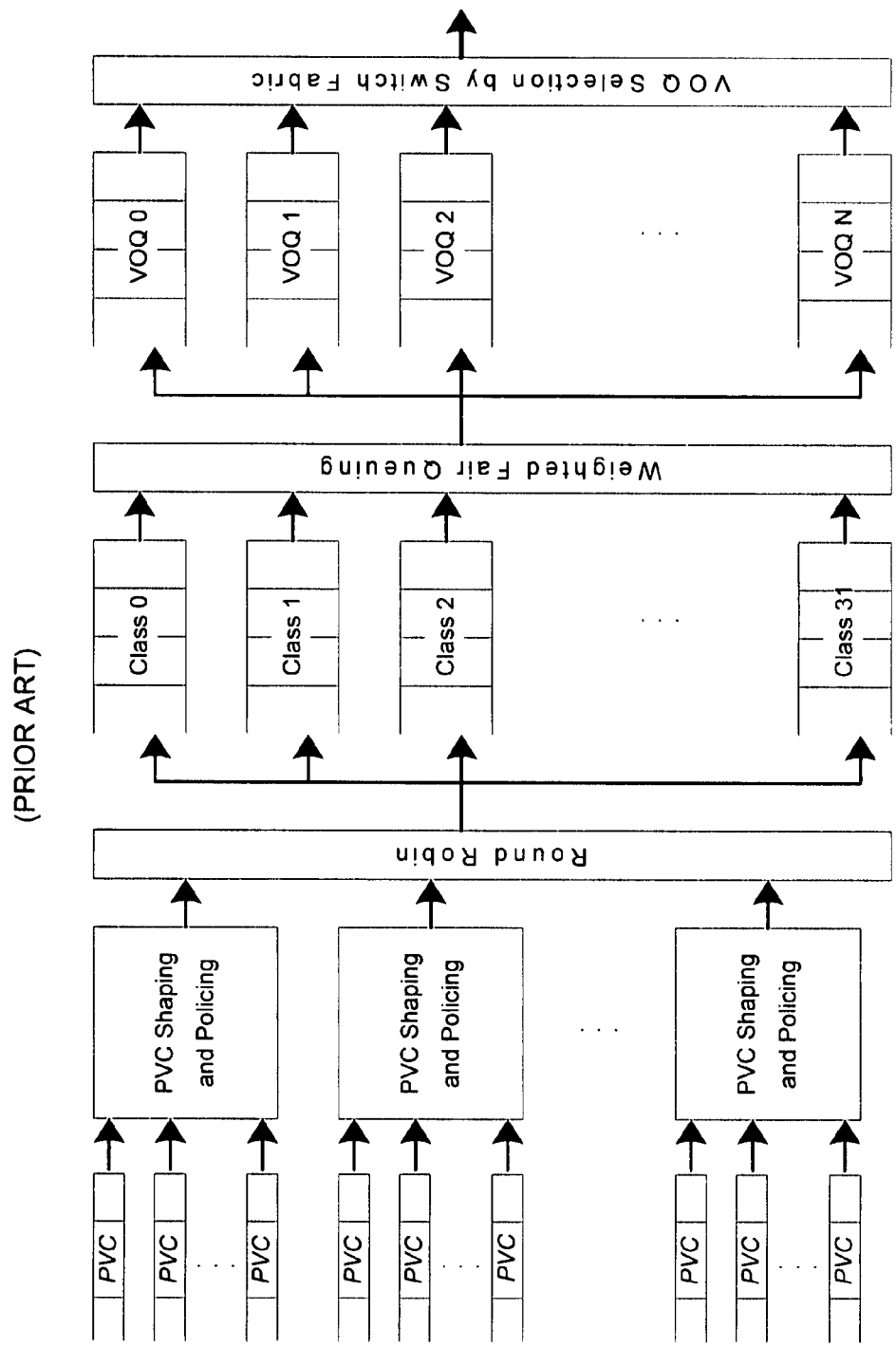

This application claims the benefit of provisional patent application No. 60/835,504 filed 2006 Aug. 4 by the present inventor.

FEDERALLY SPONSORED RESEARCH

Not Applicable

SEQUENCE LISTING

Not Applicable

BACKGROUND

1. Field of Invention

This invention relates to a method for efficiently storing and retrieving data. More particularly this invention relates to dynamic or static data associated with a set of service tags and a method for arbitrating between the data using these service tags. The data structure and the method are particularly advantageous for implementation in digital computer hardware. The primary application of current interest is to circuits used for traffic management in high-speed switches and routers. However, this invention may be useful in a variety of applications involving input data that is stored and then retrieved based on the priority of service tags. Consequently, the selection of data retrieved is an arbitration decision between the data stored. The data stored may be considered as separate parties each contending for the retrieval resource.

A very useful application of this invention is in the construction of devices which participate in Internet Protocol (IP) networks or Asynchronous Transfer Mode (ATM) networks. The following discussion reviews how the features of an arbitration scheme can lead to "rich networking services" or traffic management, and how this invention's arbitration provides better traffic management.

At every point of contention in a network, packets or cells must be prioritized to ensure Service Level Agreements (SLA). Underlying, identified flows often serve as the prioritization criterion. This re-ordering of packets modifies the traffic shape of these flows and requires a buffer.

The scheduling discipline chosen for this prioritization, or Traffic Management (TM), can affect the traffic shape of flows and micro-flows through: Delay (buffering); Bursting of traffic (buffering and bursting); Smoothing of traffic (buffering and rate-limiting flows); Dropping traffic (choosing data to discard so as to avoid exhausting the buffer); Delay jitter (temporally shifting cells of a flow by different amounts); Not admitting a connection (cannot simultaneously guarantee existing SLAs with an additional flow's SLA).

In current non-centralized router architectures, the TM provided by the switch fabric consists of a small number of depth-limited queues of strict priority. Therefore, the TM on the ingress and egress of each line card must carry the burden of enforcing SLAs.

2. Prior Art

The standard method of implementing traffic management is Weighted Fair Queuing (WFQ); it approximates the "ideal" Max-Min Weighted Fair Share scheduling very closely. However, providing WFQ to every flow or connection in a box is unwieldy to implement. As a consequence, discard methods such as Weighted Random Early Detect (WRED) and policing methods such as Dual-Leaky Bucket (DLB) were created to aggregate flows into a much smaller number of queues as well as approximations to WFQ. By making each of these queues corresponded to a service level, or class, one could employ Class Based WFQ (CBWFQ) easily. This scheme is logically diagrammed in FIG. 1A.

Before the processing shown in FIG. 1A, cells have already been stored in DRAM in a linked list manner. This buffer management may be done per virtual circuit (VC) and accomplished using a free-list memory, and head and tail storage for each VC.

As shown in FIG. 1A, traffic is policed and shaped at one of 16 "port-level" schedulers depending on the number of channels on the line-card. According to the bandwidth of each port, a Round Robin or Weighted Round Robin arbiter transports each flow number, effectively a private virtual circuit (PVC) number (not data), to a class-based queue. Here PVCs of the same class, irrespective of port, are aggregated to be scheduled by the WFQ scheduler. A given class-based queue may contain thousands of PVCs. As WFQ decisions are made, cells or packets are further queued by destination-interface to prevent Head of Line (HoL) blocking. This may be a destination interface on a switch fabric or a destination port on an egress path.

Figure 1B:
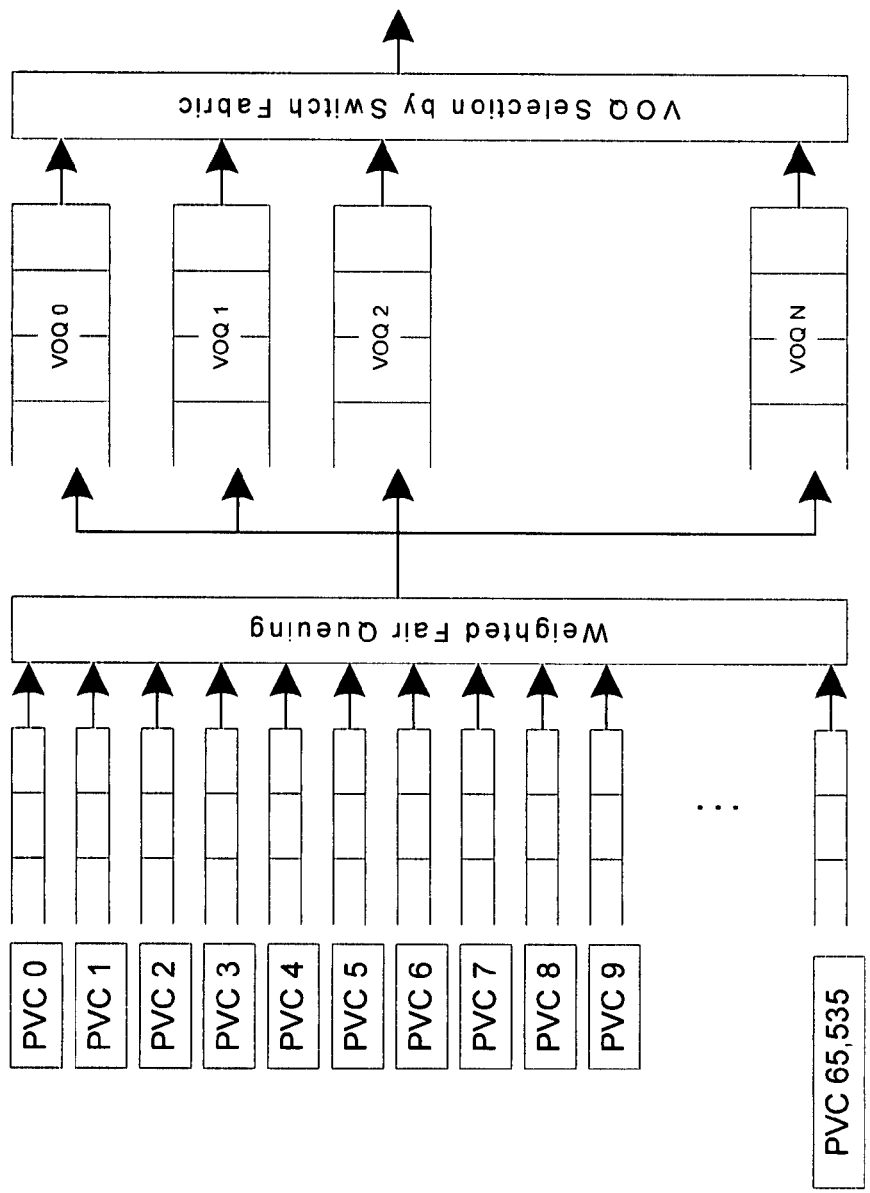

The invention can be used to make an approximate WFQ decision amongst a very large number of queues. This eliminates many of the complexities previously mentioned. The ability to make such large scheduling decisions simplifies much of the surrounding logic as shown in FIG. 1B.

In addition, the invention serves to perform traffic shaping on every queue. The resulting quality of service (QoS) capability will now be described in greater detail using ATM traffic classifications familiar to those of ordinary skill in the art.

Using the common Traffic Management design in FIG. 1A, the delay of a given packet/cell is determined by the behavior of other connections in the same class. All connection in a class-based queue have been policed, but often with a large allowed Maximum Burst Size (MBS). Consequently, the Maximum Cell Transfer Delay (CTD) is equal to the aggregate burst size of each connection present in the class-based queue. If statistically less than 1 packet in a million (to achieve five 9's) is delayed at a certain connection admission level, then the added delay can be ignored by current networking equipment standards. However, the Gaussian curve formed by uncorrelated bursting sources does extend well enough to make a significant impact; guarantees can only be hedged by ~30%. This means the percentage of VBR-rt connections admission control must deny is on the order of the Peak Cell Rate (PCR) to Sustained Cell Rate (SCR) ratio. When this same scheme is used with IP packets (DSCP enabled) or Label-Switched Paths (LSPs), real-time applications become infeasible.

Using the invention, every connection and connection type—a VBR-rt PVC, a MPLS pipe, a Martini-Frame-Relay tunnel—gets the theoretical minimum delay through the scheduler. With cells, this delay is guaranteed. With packets, the only unfairness stems from very large packets; they proscribe a scheduling decision during the middle of their transfer. This allows Admission Control to accept an enormous number of real-time connections with minimum delay budgeting.

Cell Delay Variation (CDV) refers to the jitter in the CTD over all cells transferred. There are many ways to quantify CDV: standard deviation, average of the differences, jitter limit of 99 out 100, etc. The ATM standard quantifies it with: CTD(max)−CTD(min).

In the common TM approach, a cell will receive more or less delay as the thousands of other connections, mapped to the same class-based queue, burst up and down. The range of jitter increases linearly with the number of connections. Admission control cannot do anything to reduce this jitter, except to reduce the number of PVCs admitted to a queue and honor any CDV guarantees only statistically. IP only exacerbates this problem with variant packet sizes adding more jitter.

Because no aggregation takes place using the invention, there is no jitter other than that caused by large packets. This deep insulation of one flow from another bodes well for PPVPNs.

The pervasive Dual Leaky Bucket (DLB) polices a mean bandwidth (SCR) and a peak bandwidth (PCR) for every flow. Policing the SCR shares the bandwidth of a class-based queue amongst its users. Policing the PCR limits the delay through and buffer use of a queue. Unfortunately, the later policer must enforce a stricter policy than is necessary. The resource that is being protected is usually a DRAM buffer. The DLB guesses at how much buffer space has (or will be) taken up by this flow and marks traffic as out-of-profile when it deems necessary.

Instead of simulating an individual queue with a DLB policer, this invention used in this application can directly use its queues for these purposes. Policing is done by directly reading the buffer usage by a particular queue. This allows large traffic peaks and relaxes the neighbor's shaping requirements. Furthermore, since use of this invention reserves shaping until the final scheduling, the shaping is more effective.

SUMMARY

This invention is a circuit-based arbitrator that has the ability to arbitrate amongst an enormous number (e.g. 1 Billion) of competing parties, whereas the current state of the art can only handle a few (e.g. 32) at the same scheduling speed. This invention uses a novel data-structure that separates arbitration data into parallel-accessed resources. This separation capitalizes on the previous comparisons made for old arbitrations. Because selecting between competing elements necessarily introduces comparison between one/several parties and other one/several parties, the invention presents a circuit comparator method, utilizing the novel data structure, requiring less computational time to make future arbitrations. Further and more specifically, I will present the method by which this class of data structures may be updated and accessed to produce a fast scheduling circuit that selects the highest priority party amongst a large number of parties.

DRAWINGS

Figures

In the drawings, closely related elements have the same numeral but different alphabetic suffixes.

FIG. 1A illustrates the prior art method of arbitration for traffic management. This example uses a number of queues consistent with conventional scheduling capacity. Additionally, it illustrates the role of policing and shaping. FIG. 1B illustrates how this arbitration could be better performed with the current invention without sacrificing scheduling speed.

Figure 2:
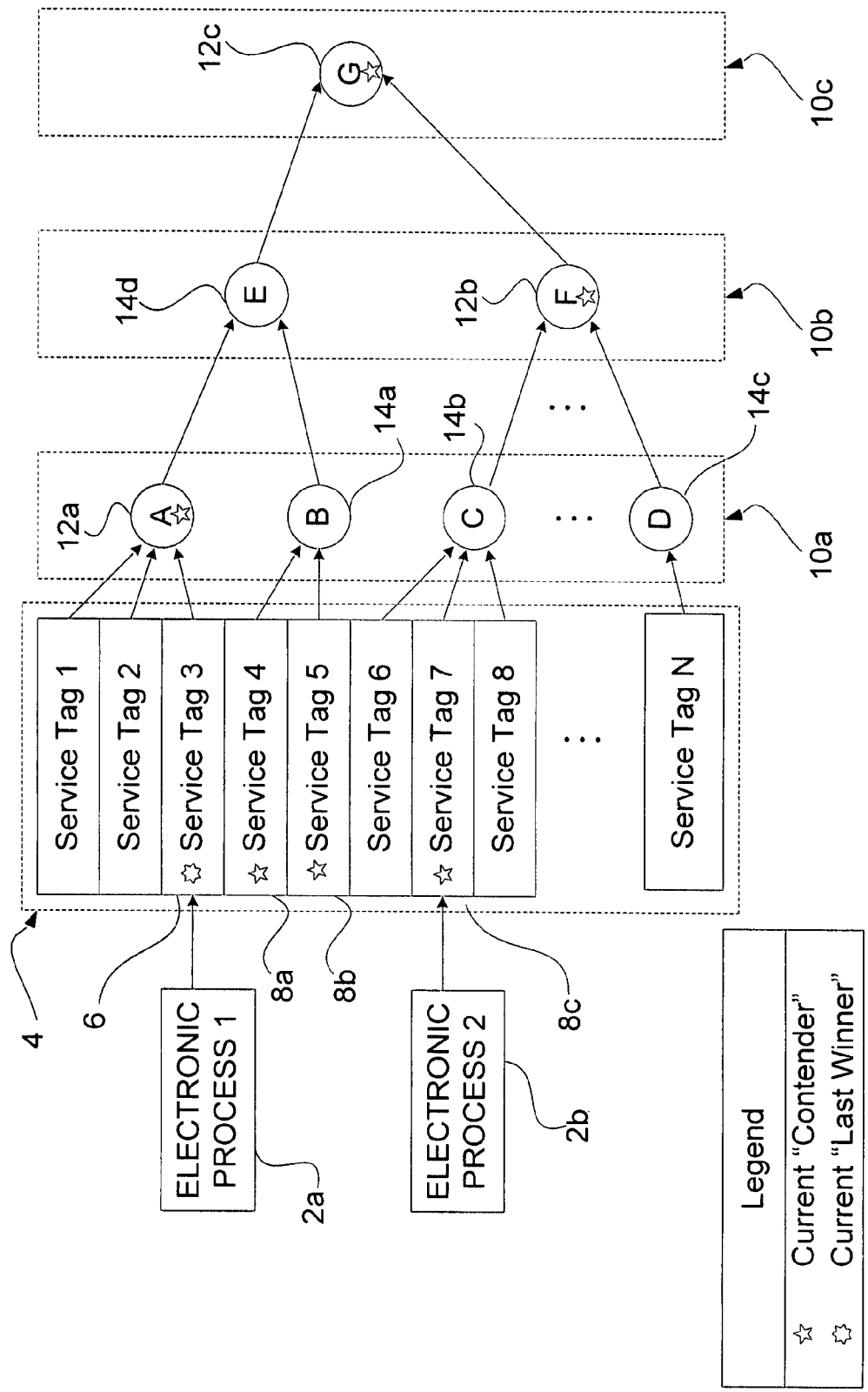

FIG. 2 uses a specific example to illustrate the relationship of Memorization Tags to Service Tags and how a set of Contenders may be deduced from both the processes producing events and the Last Winner.

Figure 3:
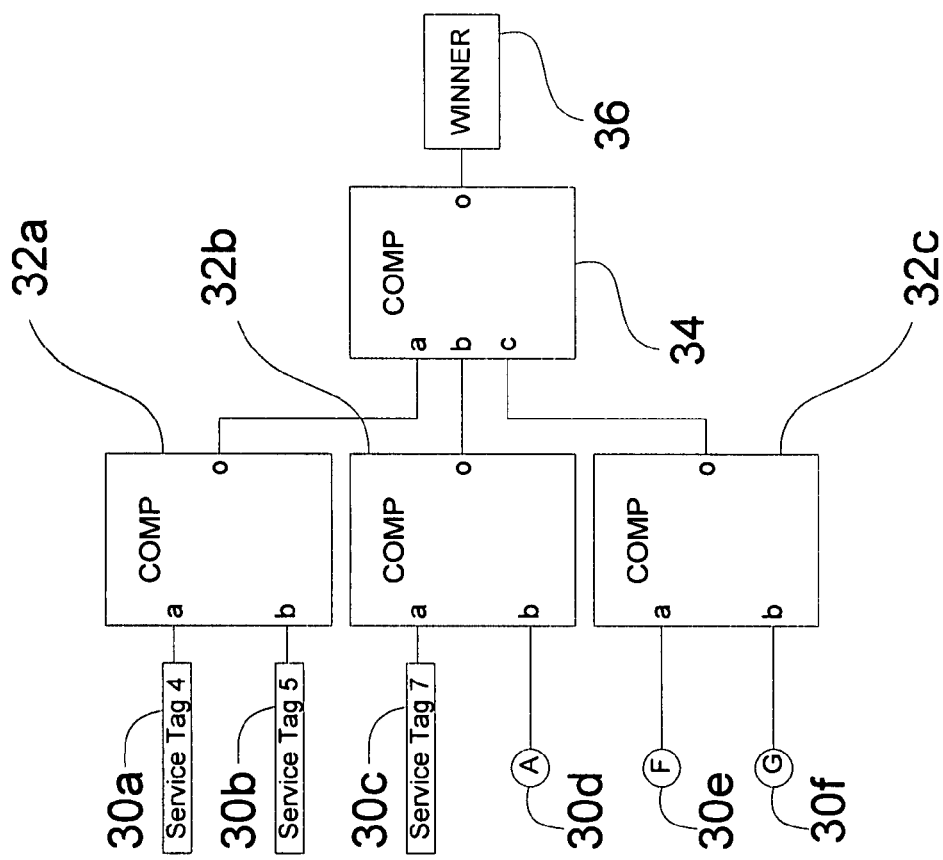

FIG. 3 shows one way how a Winner may be computed from the Contenders in FIG. 2 by means of comparisons.

DRAWINGS

Reference Numerals

| | |
|---|---|
| 2a | A representation of an electronic process that creates Events, in example it changes the Service Tag of the $3^{rd}$ party |
| 2b | A representation of another, second, electronic process that creates Events, in example it changes the Service Tag of the $7^{th}$ party |
| 4 | All the service tags are leaves of the tree |
| 6 | The Service Tag associated with the $3^{rd}$ party that has been modified (an Event) by some electronic process 2a, and is the Last Winner |
| 8a | The Service Tag associated with the $4^{th}$ party that is a sibling of the Last Winner and, as such, is a Contender |
| 8b | The Service Tag associated with the $4^{th}$ party that is a sibling of the Last Winner and, as such, is a Contender |
| 8c | The Service Tag associated with the $7^{th}$ party that has been modified (an Event) by some electronic process 2b and is a Contender |
| 10a | The first ply of the tree storing Memorization Tags |
| 10b | The second ply of the tree storing Memorization Tags |
| 10c | The third, and final, ply of the tree storing Memorization Tags |
| 12a-12b | Memorization Tags that form siblings of the Path of the Last Winner |
| 12c | The final Memorization Tag that indicates the Last Winner |
| 14a, 14d | The Path of the Last Winner, but missing final node 12c |
| 14b-c | Memorization Tags that will not be used in the computation of the Winner |
| 30a-30f | The value of the Service Tags of Contenders that must be compared to find a Winner |
| 32a-32c | Binary comparators in the first level of a comparator tree |
| 34 | A three way comparator in the second level of the comparator tree |

DETAILED DESCRIPTION

FIG. 2 illustrates the relationship of the Memorization Tags 12a-12c, 14a-14d to the Service Tags 4. Each Service Tag 4 can be updated by one or more electronic processes 2a, 2b. The Memorization Tags 12a-12c, 14a-14d form nodes on a tree 10a-10c so that each node holds an indication of which of its children (grandchildren, etc.) is the highest priority. At any given time there is a Last Winner 6, and set of Contenders 12a-12c that form along a tree path. The memory structure 10a-10c forms a hierarchy, where each memory 10a-10c is accessed in parallel to fetch possible Contenders.

FIG. 3 shows an example of how the arbiter can select amongst Contenders 8a-8c, 12a-12c in such a short amount of time. Because electronic comparators 32a-32c can be arranged in a tree, comparator inputs 30a-30f can service all of the Contenders 8a-8c, 12a-12c. In this example, the Last Winner 6 is the same Service Tag being updated by an electronic process 2a, and so only one comparator input 30f is required since the Service Tag is the same. Additional comparators, not shown, are needed to update the Memorization Tags 12a-12c, 14a-14d due to the events 2a-2b.

Operation

This invention presents a class of such data structures and how they may be updated and accessed to produce a fast scheduling circuit that selects the highest priority (the priority may be encoded as a bit group in the Service Tag 4) party amongst a large number of parties (or group of data elements contending for a resource), the selection is termed the Winner 36. The selection made in the temporally previous arbitration decision is termed the Last Winner 6. The number of competing parties will be denoted by the variable N.

The invention uses a tree structure 10a-10c between the Service Tags 4, where each parent node (termed Memorization Tag) 12a-12c, 14a-14d stores an indication of which of its children has the highest priority. The leaves 4 of the tree are the Service Tags 4 themselves. Whenever a Service Tag 4 changes (termed an Event) each parent node 12a-12c, 14a-14d (or Memorization Tag) of the Service Tag, all the way to the root 12c, is updated to reflect the new highest priority Service Tag among the children (grandchildren, etc.) of that particular Memorization Tag. These Memorization Tags 14a, 14d, 12c are termed the Path of that Service Tag and of that Service Tag's associated party. Every Service Tag has only one Path, and every Path contains only one Memorization Tag per ply 10a-10c (also called tree-level) of the tree 10a-10c.

If no Events occurred during the previous arbitration decision, then the Winner 36 will be the Last Winner 6. If one or more Events occurred during the previous arbitration decision, this invention can select the Winner 36 by comparing only certain parties to one another. The parties that must be compared are termed, Contenders 8a-8b, 12a-12c. The Contenders 8a-8c, 12a-12c include all the sibling nodes of each node 12a, 12b contained in the Last Winner's Path 14a, 14d, 12c as well as the Last Winner 12c. Additionally, each party whose service tag 4 has been modified by an Event 8c, 6, during the previous arbitration decision, is also a Contender. For example, if the tree 10a-10c were a binary tree and two events occurred during the previous arbitration decision, then the total number of Contenders would be log(N)+2: there is one sibling at each ply of the tree plus the parties associated with the two modified Service Tags. If a comparator tree were used amongst these Contenders, only log(log(N)+2) level of comparator logic would be necessary to select a Winner. Hence, 1 Billion Queues could be scheduled at the same frequency as a traditional arbiter could schedule 32 queues.

In a scheduling application, Events often occur due to: the highest priority party being given arbitration and their Service Tag priority is then reduced; a new party is added to the scheduler or data has arrived for a previously fully-serviced party; a given party's rate of service changes. One comparison per Event, per ply of the tree 10a-10c is required to update the affected Memorization Tags. But, Memorization Tags affected by multiple Events 12c must choose the highest priority Service Tag. This choice will not limit the speed of the scheduling decision if the maximum number of events that can take place during a scheduling decision is less than number of plies 10a-10c in the tree (as a simple comparator tree can then make the update). Because this invention increases the possible scheduling frequency, this criterion is easily met in all popular applications.

Advantages

From the description above, a number of advantages of some embodiments of my circuit and method for arbitration become evident:

(a) Arbitration decisions can be made with higher frequency, due to requiring a smaller comparator tree to identify the winner that other required without the use of memorization tags.

(b) Arbitrations decisions can be made between a larger number of parties, due to a logarithmic order decrease in the number of contenders at any given time.

(c) The number of comparators required to generate the arbitration decision for a given number of parties is far less.

CONCLUSION, RAMIFICATION, AND SCOPE

Accordingly, the reader will see that the presented method, by using memorization tags novel data structure and circuits, can exponentially improves the performance and capacity of a scheduling circuit. Although the invention has been described in connection with a specific embodiment, it is understood that this invention is not limited to the embodiments disclosed, but is capable of various modifications, for example: varying pipelining, alternate compare functions and tag data representations, alternative data representations for memorizing the winner of compare, varying memory element type and/or size, replacing digital electronics with analog electronics, or mapping parts of the hardware design onto programmable hardware such as FPGAs, which would be apparent to one of ordinary skill in the art. Thus, the invention is limited only by the following claims and their legal equivalents.

I claim:

1. A circuit producing an outgoing, electronic data stream by arbitrating between a plurality of incoming data streams, comprising:
   (a) a first electronic memory storing a first plurality of data records,
   (b) a second electronic memory storing a second plurality of data records,
   (c) a third electronic memory storing a third plurality of data records,
   (d) a fourth electronic memory storing one data record,
   (e) a first plurality of electronic comparators,
   (f) a second plurality of electronic comparators,
   (g) a third plurality of electronic comparators,
   (h) an arbitration goal between said plurality incoming data streams,
   (i) said first plurality of data records store a current priority for each of said plurality of incoming data streams to conform with said arbitration goal,
   (j) each of the records, of said second plurality of data records, stores a value identifying the record of highest priority amongst a subset of said first plurality of data records,
   (k) each of the records, of said third plurality of data records, stores a value identifying the record of highest priority amongst a subset of the records of highest priority identified by said second plurality of data records,
   (l) the record, stored within said fourth electronic memory, stores a value identifying the record of highest priority amongst the records of highest priority identified by said third plurality of data records,
   (m) the subsets used by the second plurality of records are disjoint,
   (n) the subsets used by the third plurality of records are disjoint,
   (o) the records of the first, second, third, and fourth electronic memories from a tree with the record stored within the fourth electronic memory representing a root, the first plurality of records representing a plurality of leaves, and each record of the second plurality of records and the third plurality of records representing nodes with edges to the respective subsets of records,
   (p) a first electronic process that, upon a departure of data to the outgoing data stream, modifies the record, of said first plurality of data records, for said outgoing data stream with a new current priority, as needed to conform with said arbitration goal,
   (q) a second electronic process that, upon an arrival of data from a first data stream of said plurality of incoming data streams, modifies the record, of said first plurality of data records, for said first data stream with a new current priority, as needed to conform with said arbitration goal, (r) said first plurality of electronic comparators first calculate, after each execution of said first electronic process, the record of highest priority for each node along a first tree traversal, from the leaf associated with said outgoing data stream to said root of said tree, respectively, (s) the first calculations are performed in parallel by comparing the priority of said outgoing data stream to the priority of each of the incoming data streams indicated by the value at each node along said first tree traversal respectively, and changing the value of the respective nodes to indicate the higher priority incoming data stream, (t) said second plurality of electronic comparators second calculate, after each execution of said second electronic process, the record of highest priority for each node along a second tree traversal, from the leaf associated with said incoming data stream to said root of said tree, respectively, (u) the second calculations are performed in parallel by comparing the priority of said first incoming data stream to the priority of each of the incoming data streams indicated by the value at each node along said second tree traversal respectively, and changing the value of the respective nodes to indicate the higher priority incoming data stream, (v) said third plurality of electronic comparators make a final calculation of the highest priority incoming data stream amongst the priorities of incoming data streams indicated by the value at each node along said first tree traversal as well as said outgoing data stream and said first incoming data stream, (w) an arbitration decision is constituted by the value of said final calculation and becomes a next outgoing data stream in a cyclic arbitration process.

2. The circuit in claim 1, wherein if the first tree traversal and the second tree traversal overlap, said second plurality of electronic comparators compare the priority of said first incoming data stream and said outgoing data stream to the priority of each of the incoming data streams indicated by the value at each node along said second tree traversal respectively, and changing the value of the respective nodes to indicate the higher priority incoming data stream.

* * * * *